United States Patent [19]
Vyakarnam et al.

[11] Patent Number: 5,888,340
[45] Date of Patent: Mar. 30, 1999

[54] METHOD AND APPARATUS FOR ALIGNING DISCONTINUOUS FIBERS

[75] Inventors: Murty N. Vyakarnam, East Lansing; Lawrence T. Drzal, Okemos, both of Mich.

[73] Assignee: Board of Trustees operating Michigan State University, East Lansing, Mich.

[21] Appl. No.: 824,801

[22] Filed: Mar. 26, 1997

Related U.S. Application Data

[62] Division of Ser. No. 612,088, Mar. 7, 1996.

[51] Int. Cl.$^6$ .............................. B29C 43/20; B29B 11/16
[52] U.S. Cl. .................. 156/379.7; 156/62.2; 156/272.2; 264/108; 264/437; 425/81.1; 425/174.8 E
[58] Field of Search ..................................... 442/150, 172, 442/180, 343, 344, 354, 366, 367, 368, 374, 415; 156/62.2, 272.2, 296, 379.7; 264/112, 108, 437; 425/81.1, 174.8 E

[56] References Cited

U.S. PATENT DOCUMENTS

| | | |
|---|---|---|
| 2,686,141 | 1/1954 | Sawyer . |
| 3,843,756 | 10/1974 | Talbott et al. . |
| 4,111,294 | 9/1978 | Carpenter et al. . |
| 4,113,812 | 9/1978 | Talbot et al. . |
| 4,347,202 | 8/1982 | Henckel . |
| 4,664,856 | 5/1987 | Talbot et al. . |
| 4,707,231 | 11/1987 | Berger . |
| 5,017,312 | 5/1991 | Peters et al. . |
| 5,057,253 | 10/1991 | Knoblach . |
| 5,102,690 | 4/1992 | Iyer et al. . |
| 5,123,373 | 6/1992 | Iyer et al. . |
| 5,310,582 | 5/1994 | Vyakarnam et al. . |

OTHER PUBLICATIONS

Agarwal, B. D., et al., Analysis and Performance of Fiber Composites, John Wiley & Sons, 120–131 (1993).
Piggott, M., "Load Bearing Fibre Composites", Permagon Press, 72–79 and 83–99 (1980).
Kacir, L., et al., Polymer Engineering and Science vol. 15, p. 525, 532 (1975); 17:234 (1977); 18:45 (1978).
Soh, S. K., et al., Proc. 10th. Annual ASM/ESD Advanced Composites Conf. & Exp., Dearborn (1994).
Erickson, M.L., et al., Composites Science and Technology 49:121–130 (1993).
Chang, I.Y., et al., J. Thermoplastic Composite Materials, 4:227–252 (1991).
Jander, M., Proc. 7th Annual ASM/ESD Advanced Composites Conf., Detroit (1991).
Demetriades, J. Chem. Phys. 29:154 (1958.
Arp, P.A., et al., Advances in Colloid and Interface Science, vol. 12:295–356 (1980).
Iyer, S.R., et al., Powder Technology 57(2), pp. 127–133 (1989).
Padaki, S., et al., "Development of a Process and Consolidation Model for Powder Prepreg Composites", Proc. 10th. Annual ASM/ESD Advanced Composites Conf. & Exposition, Dearborn (1994).
Nichols, D., "Glass–mat Thermoplastics Form Structural Parts", Advanced Materials & Processes, 10, pp. 29–32 (1994).

*Primary Examiner*—Michael W. Ball
*Assistant Examiner*—Sam Chuan Yao
*Attorney, Agent, or Firm*—Ian C. McLeod

[57] ABSTRACT

A method and apparatus for aligning discontinuous fibers (F 101, 212) is described. A feeder apparatus (20, 120, 220, 220A) is used to align the fibers in a horizontal plane for feeding to the aligning apparatus (40, 140, 240, 240A) providing an electrical (E) field to orient the fibers in one preselected direction. A support or conveyor (70, 170, 270) receives the aligned fibers. The method and apparatus provides composite products having improved physical properties because of the alignment. The fibers can be of different lengths and a mixture of different types to make composites with controlled microstructure and properties. The composite materials can be in the form of non-woven, discontinuous fiber reinforced thermoplastic stampable sheets with controlled fiber orientation distribution. The composites are useful for a variety of goods.

11 Claims, 13 Drawing Sheets

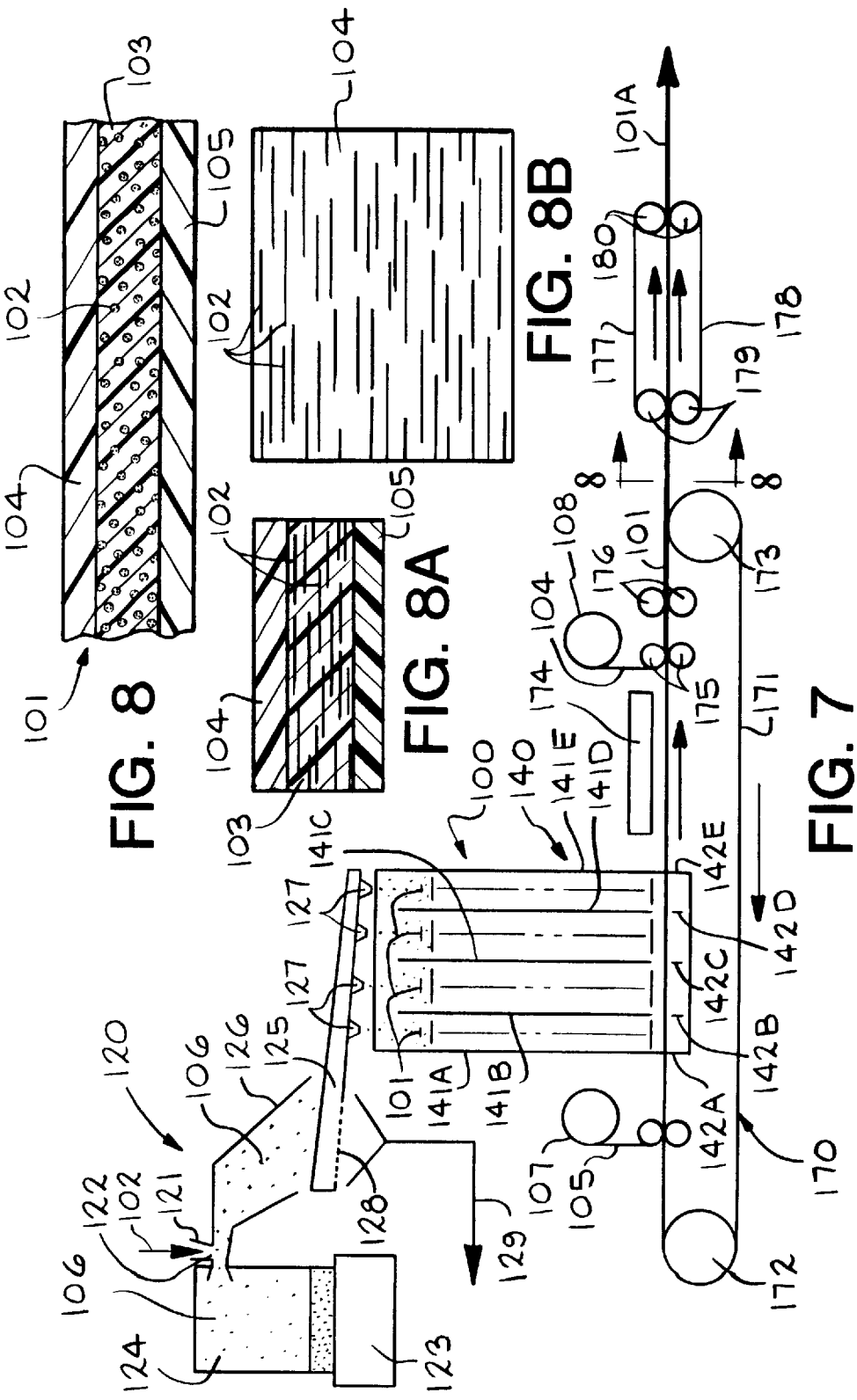

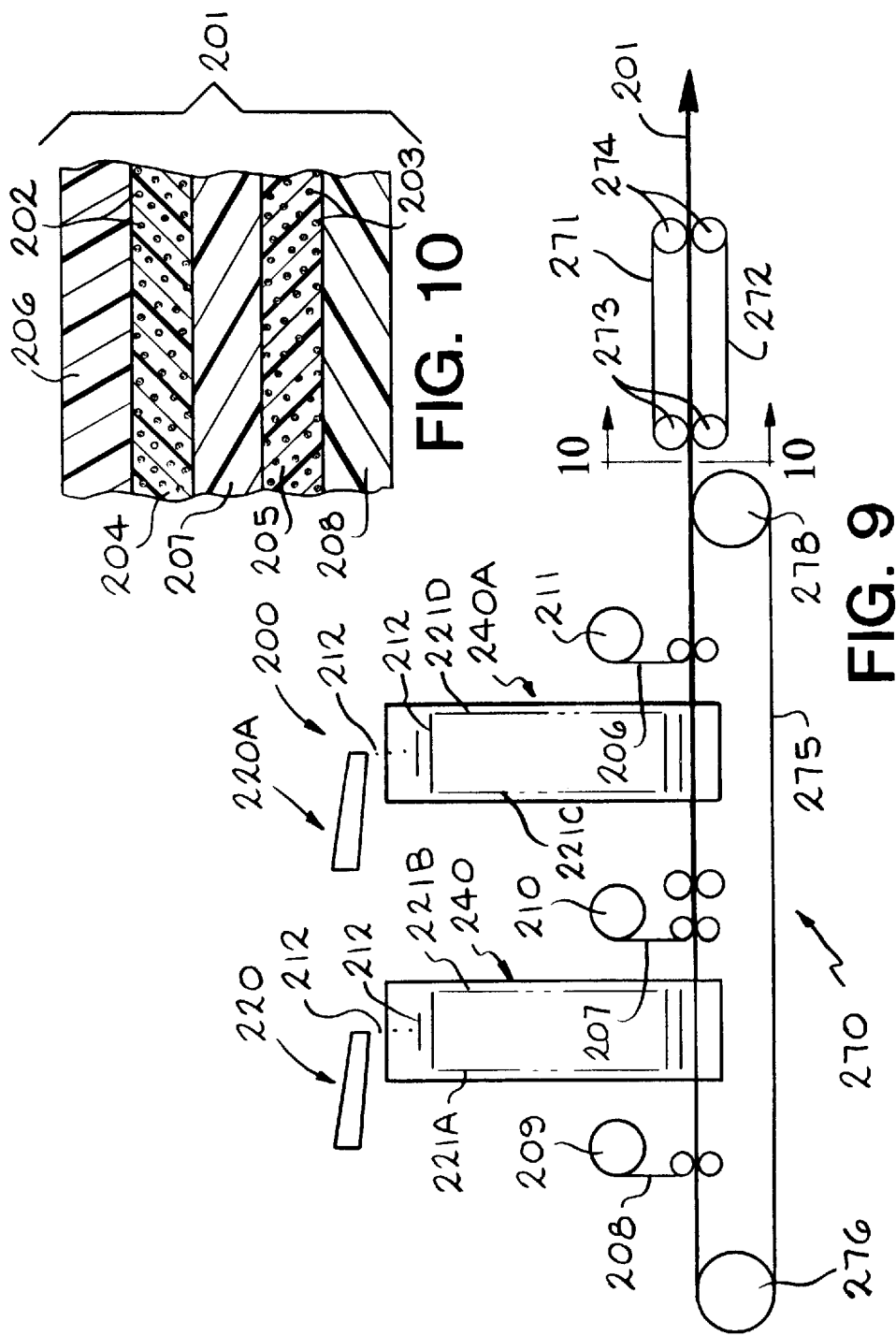

METHOD AND APPARATUS FOR ALIGNING DISCONTINUOUS FIBERS

This is a divisional of application Ser. No. 08/612,088 filed on Mar. 07, 1996.

BACKGROUND OF THE INVENTION

(1) Field of the Invention

The present invention relates to an improved method and apparatus for aligning discontinuous fibers using spaced apart plates having an electrical field between them and a feeder apparatus for aligning the fibers for movement between the plates. The feeder apparatus is characterized by preferably having an elongated slot or slots which align the long axis of fibers in a horizontal plane for subsequent perpendicular alignment between the plates, thereby preventing the fibers from moving with the long axis in the vertical plane and essentially falling in an uncontrolled manner. Further, the invention relates to the manufacture of a non-woven, discontinuous fiber reinforced thermoplastic sheet with controlled fiber orientation distribution.

(2) Description of Related Art

Micro-mechanics models for composite materials predict that in discontinuous fiber composites, modulus and strength values approach that of the unidirectional continuous fiber composites, when the length of the fibers far exceed the critical fiber length and when the fibers are aligned in the direction of the load (Agarwal, B. D., et al., Analysis and Performance of Fiber Composites, John Wiley & Sons, 121–131 (1990); and Piggott, M., "Load Bearing Fibre Composites", Permagon Press, 72–79 and 83–89 (1980)). Aligned discontinuous fiber polymer composites have a clear advantage over other composite material systems with respect to overall performance and processability and are potentially well suited for lightweight structural applications. Several techniques using hydraulic, electrical, magnetic or pneumatic means have been tried in the past to orient fibers in a preferred direction while processing discontinuous fiber composites. However, these methods of making aligned discontinuous fiber composites have met with limited success because the methodologies that were developed did not bring about any significant reductions in fabrication times or costs.

There is a need for an improved method that can manufacture discontinuous fiber composites with the fibers preferentially aligned in one direction using electric fields. There is a need for a method amenable to high degree of automation and high speeds of operation, thereby reducing the cycle time needed to fabricate an oriented discontinuous fiber composite sheet or part.

Controlling the orientation of short/discontinuous fibers has been a challenge in the processing of composite materials be it in glass fiber sheet molding compound (SMC) processing, resin injection molding (RIM) preform manufacture or injection molding. With increased realization of the performance payoffs of aligned discontinuous composites, several attempts have been made to control fiber orientation. A review of literature relating to fiber alignment techniques that can be used in the fabrication of aligned discontinuous fiber composites is presented where the techniques are broadly classified into two categories viz. wet/slurry methods and dry methods. This categorization lends itself to the general conclusion that wet/slurry methods are typically slower and less flexible in controlling fiber orientation as compared to the dry methods.

In the wet methods (Kacir, L., et al., Polymer Engineering and Science, Vol. 15, p. 525, 532 (1975); Vol. 17, p. 234 (1977); Vol 18, p. 45 (1978); and Soh, S. K., Proc. 10th. Annual ASM/ESD Advanced Composites Conference & Exposition, Dearborn (1994)), the fibers are usually in a well agitated liquid suspension and a fiber mat is created by either draining the liquid or raising a filter bed through the suspension. Control of fiber orientation is limited, but can be achieved to some degree by guiding vanes or other means like electric fields when the liquid is dielectric (Knoblach, G. M., U.S. Pat. No. 5,057,253). The drawbacks in these processes is the introduction of an additional step of drying the wet mat which reduces the speed of manufacturing drastically, and secondly the fact that fiber mat preform has to be further processed by reaction injection molding or polymer sheet impregnation to result in a composite part. The mechanical performance of the final part may also be sometimes lowered due to the presence of voids entrapped during the drying of the wet fiber mat.

Dry methods ((Talbot, J. W., et al., U.S. Pat. Nos. 4,664, 856 (1987); 4,113,812 (1978); and Peters, T. E., et al., U.S. Pat. No. 5,017,312 (1991)) usually rely on electric fields or pneumatic means ((Ericson, M. L., et al., Composites Science and Technology 49:121–130 (1993)) to control fiber orientation and are generally faster than the wet processes. Peters et al (U.S. Pat. No. 5,017,312) had developed the technology to manufacture oriented chopped glass fiber mats where a complicated array of electrodes are embedded at the bottom of the mat that is being formed and also above the mat to force orientation of the fibers as they descend. Lack of proper understanding of the fiber electro-dynamics resulted in a complicated orientation technique. Besides, the end product is a fiber preform which needs additional processing of liquid resin molding, before it can become a final composite part. Other patents of interest are U.S. Pat. Nos. 2,686,141 to Sawyer, 4,111,294 to Carpenter et al, 4,347,202 to Henckel et al, 4,707,231 to Berger and 5,017, 312 to Peters et al. DuPont (Chang, I. Y., et al., J. Thermoplastic Composite Materials, Vol. 4, p 227–252 (1991)) introduced a long discontinuous fiber (LDF) thermoplastic composite prepreg for aerospace applications that has fibers several inches long which makes it less flexible in molding complex shapes. Moreover, the starting material is a continuous fiber impregnated prepreg. Another approach for making oriented preformed glass mat reinforced thermoplastics is by using spray-up techniques (Jander, M., Proc. 7th Annual ASM/ESD Advanced Composites Conference, Detroit (1991)). Although these techniques are fast, only stiff and long fiber bundles (1"–2") can be oriented by this technique which generally results in poor matrix impregnation and inflexible fiber preforms.

The problem in the prior art is that the fibers are randomly introduced between the E-field plates. In general, this tends to result in a large fraction of fibers which are not oriented by the electrical field, particularly when the fibers have a longitudinal long axis which is essentially vertical. There is also a problem with rebound of the fibers on the surface where they are to be deposited. The result is fibers which are not properly aligned, regardless of the method used to overcome distortions of the plate adjacent electrical field to the mat.

The widespread use of high performance continuous fiber composites is limited to a great extent due to expensive fabrication costs, while discontinuous or short fiber composites form a major share of the fiber reinforced composites for non-structural applications, due to ease in processability. To optimize the balance between performance and processability in polymer composite material systems, a novel high speed method was developed which produces aligned discontinuous fiber composites (ADF) using electric fields.

OBJECTS

It is therefore an object of the present invention to provide a method and apparatus for reliably positioning discontinuous fibers when using E field plates by controlling the fiber electrodynamics. Further, it is an object of the present invention to provide a method which is relatively easy to perform and amenable to high degree of automation. Further still, it is an object of the present invention to provide a relatively simple feeder apparatus which pre-positions the discontinuous fibers between the E-field plates.

Further, it is the object of this invention to use fibers coated with polymeric powder to (i) provide a high speed methodology for manufacturing aligned discontinuous fiber composites; and (ii) provide a method for manufacturing thermoformable or compression moldable aligned discontinuous fiber composite sheet.

These and other objects will become increasingly apparent by reference to the following description of the invention and the drawings.

BRIEF DESCRIPTION OF DRAWINGS

FIG. 7 is a front schematic view of an apparatus 100 including feeder apparatus 120, alignment apparatus 140 and conveyor apparatus 170 for continuously producing a composite product 101.

FIG. 8 is a cross-sectional view of the composite product 101 produced by the apparatus 100 of FIG. 7 wherein the fibers 102 are aligned in the direction of travel of the conveyor apparatus 170. FIG. 8A is a side view of the composite product 101 and FIG. 8B is a plan view of the composite product.

FIG. 9 is a front schematic view of an apparatus 200 including feeder apparatus 220, alignment apparatus 240 and 240A and conveyor apparatus 270 for continuously producing a composite product 201.

FIG. 10 is a cross-sectional enlarged view of the composite product 201 produced by the apparatus 100 of FIG. 9 wherein the fibers 202 and 203 are aligned in the direction of movement of the conveyor apparatus 270.

FIG. 11A shows an E field of 400 KV/m and FIG. 11B is without the E Field.

DESCRIPTION OF PREFERRED EMBODIMENTS

Figure 1:
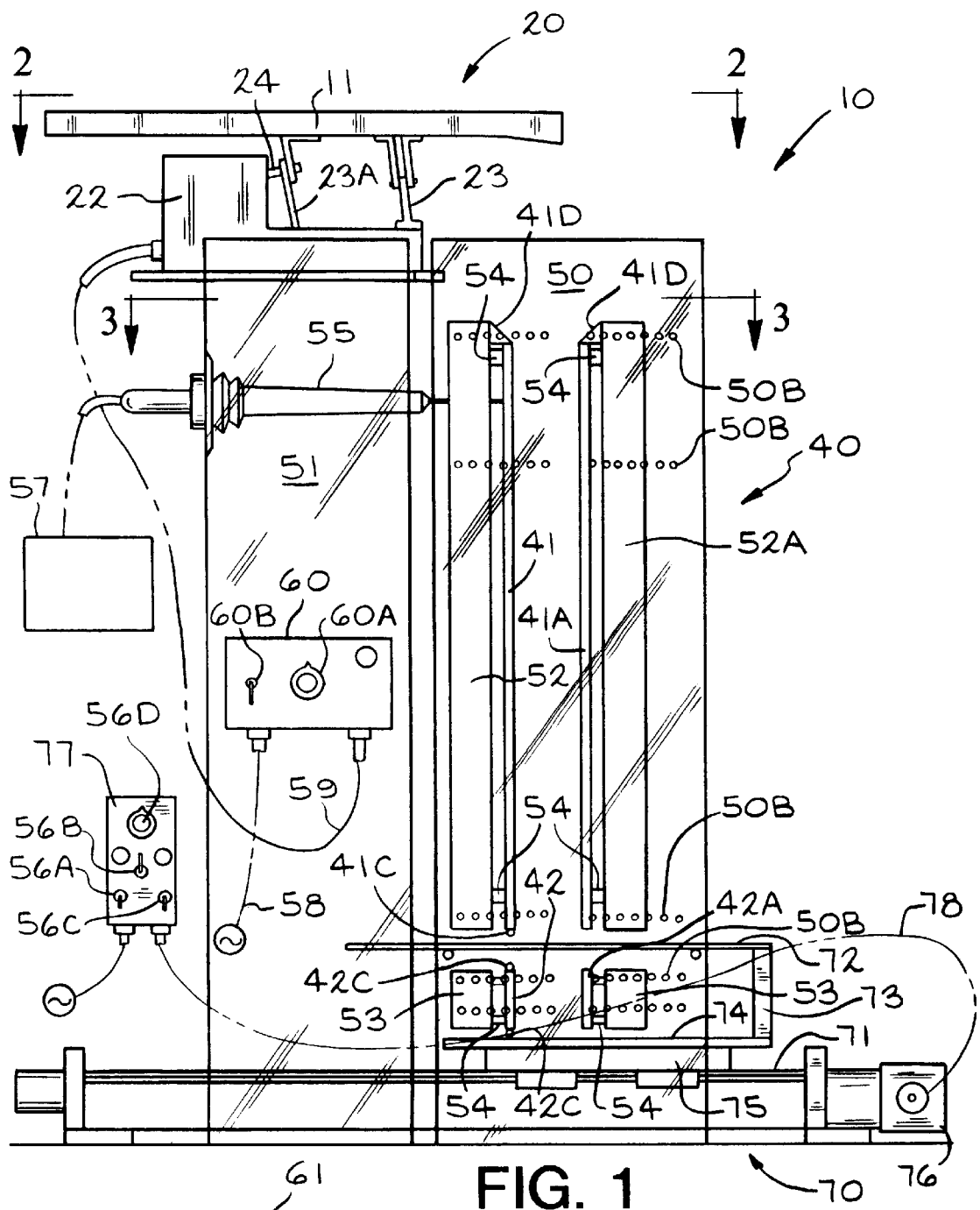
FIG. 1 is a front view of the apparatus 10 of the present invention particularly showing a feeder apparatus 20 for aligning a stream of discontinuous fibers F between parallel plates 41 and 41A provided with an electrical field in an alignment apparatus 40.
Figure 1A:
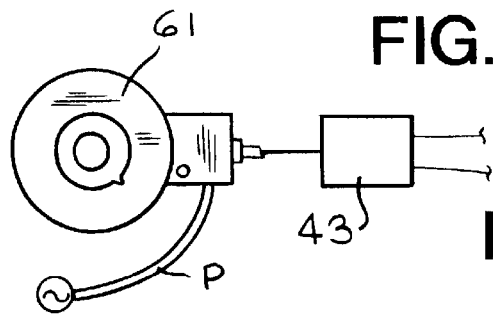
FIG. 1A is a plan view showing voltage source 43 for plates 41 and 41A.
Figure 2:
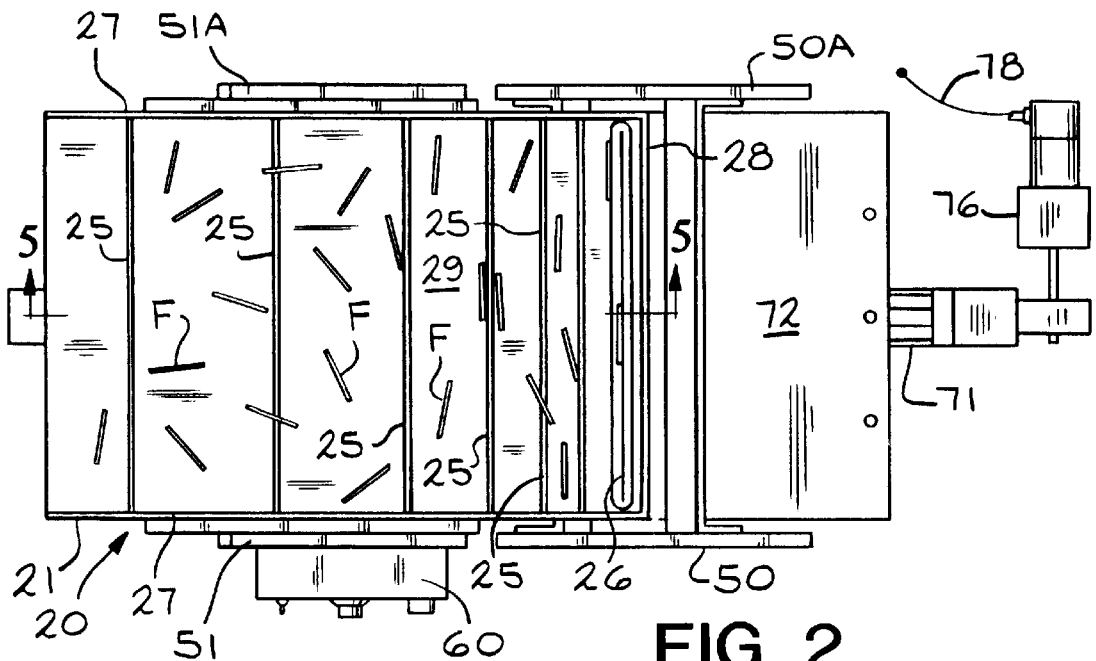
FIG. 2 is a plan view of the apparatus 10 along line 2—2 of FIG. 1, particularly showing the aligning of the fibers F by the feeder apparatus 20.
Figure 3:
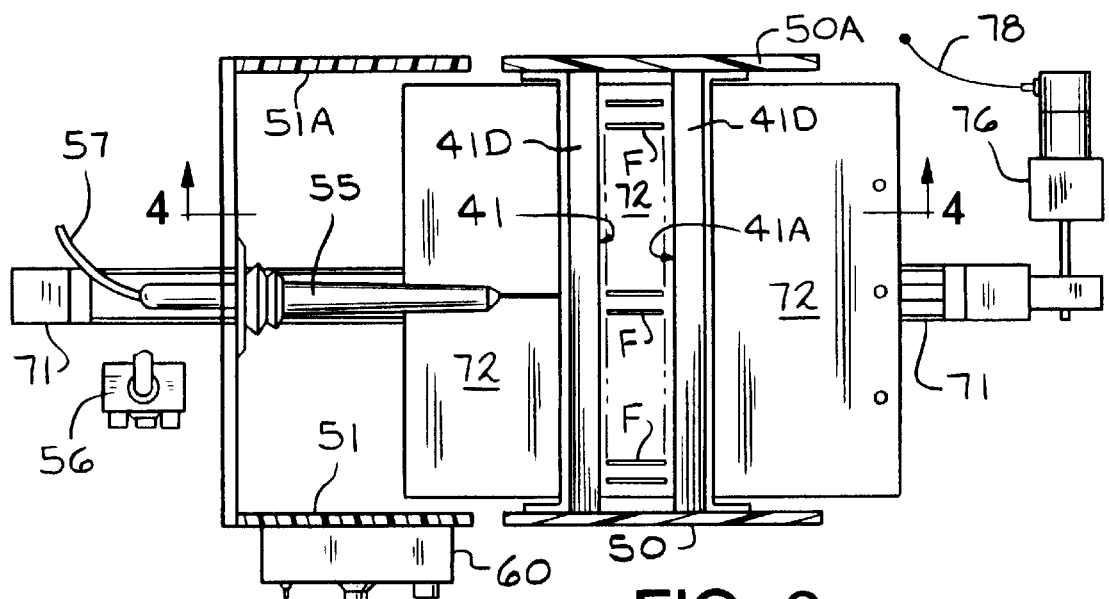
FIG. 3 is a cross-sectional view along line 3—3 of FIG. 1, particularly showing the spacing of parallel plates 41 and 41A.

The present invention relates to a method for producing a composite material of aligned discontinuous fibers having a relatively long axis and relatively small cross-section which comprises: feeding the fibers oriented in a horizontal plane along the long axis in a space having an electric field between spaced apart vertically oriented electrode plates so as to effectively align the fibers substantially horizontally with the long axis between the electrode plates; depositing the aligned fibers on a surface; and bonding the aligned fibers together, preferably with a polymeric material.

The present invention also relates to a method for producing a continuous sheet of a composite material of aligned discontinuous fibers having a relatively long axis and a small cross-section which comprises: introducing a flow of the discontinuous fibers coated with a polymer powder or any combination of polymer powders into a space in a chamber having an open end away from where the coated fibers are introduced horizontally aligned along the long axis to produce a suspension of the coated fibers in the space provided by a chamber; providing an electric field between spaced apart vertically oriented electrode plates adjacent the open end of the space and adjacent to the open end of the space of the chamber so as to align the polymer coated fibers horizontally in a direction with the long axis between the electrode plates in the chamber; depositing the coated fibers in the direction on a moving support from the open end of the chamber; and heating the fibers on the moving support outside of the chamber so as to melt the polymer powder and connect the fibers together, thereby forming the sheet of the composite material.

The present invention also relates to an apparatus for providing a sheet of aligned discontinuous fibers having a relatively long axis and a small cross-section which comprises: a vertically oriented chamber defining a space with an open end; feed means for introducing a flow of the discontinuous fibers oriented in a horizontal plane into the space in the chamber; spaced apart electrode plates in the space in the chamber and adjacent the open end of the chamber for providing an electrical field in the space in the chamber to align the fibers with the long axis between the plates; support means below the open end of the space for depositing of the aligned fibers.

Finally the present invention relates to an apparatus for producing a continuous sheet of a composite material of aligned discontinuous fibers having which comprises: a vertically oriented chamber defining a space with an open end; feed means for introducing a flow of the discontinuous fibers oriented in a horizontal plane coated with a polymer powder into the space in the chamber; spaced apart electrode plates in the space in the chamber and adjacent the open end of the chamber for providing an electrical field in the space in the chamber to align the fibers with the long axis between the electrode plates; a support means which is moved by a drive means past the open end of the chamber so as to continuously deposit the coated fibers on the support means; and heater means away from the chamber through which the support is moved so as to melt the polymer powder and connect the fibers together to form the composite material.

In its general form, the method preferably consists of three unit operations; dry powder impregnation of short fibers with the polymer matrix and mechanical orientation of the fibers; fiber orientation control using electric fields; and compression molding of the flexible aligned discontinuous fiber mat. The method provides a quick and effective means for fiber orientation and is characterized by absence of solvents or liquids during processing and flexibility of the ADF mat which can be rapidly molded into a complex part. In particular, the high speed manufacturing methodology and the performance of glass fiber-nylon 12 ADF composites for structural applications are shown in the Examples.

The method and apparatus of the present invention can be used with discontinuous fibers of any type including natural, carbon, glass or polymer fibers. The fibers do not have to be conductive to be oriented by the electrical field. If necessary, a sizing of any suitable composition can be applied to the fibers before or after they are cut into the discontinuous fibers.

The discontinuous fibers have a relatively long length along a long axis and a relatively small cross-section, which is usually round. Usually the fibers are the diameter between about $10^{-3}$ and 10 mm and a length between about 0.3 and 5 cm. Preferably the cross-section is uniform along the length. Usually the fibers are in the form of bundles of between 50 and 3000 fibers. In the composite product the fibers can have different lengths and can have different compositions. The composite material sheets so formed, if thermoplastic, can be stampable with heating. For tensile modulus properties to approach those of continuous fiber composites, the length of the fibers have to be greater than the critical fiber length (for details refer to Agarwal et al and Piggott et al (cited above). Ten times the critical fiber length will result in approximately 95% of the modulus values of the unidirectional continuous fiber reinforced composite. In simple terms this critical length depends on the interfacial shear strength between the fiber and the matrix and the fiber diameter. For chopped glass fiber-nylon matrix composites, the length at which the properties approach those of equivalent continuous fiber composites is approximately one (1) inch (2.54 cm).

The mat of fibers can be formed and then impregnated with a polymer or the like to form a composite product and/or can be laminated with a polymer. Alternatively, the fibers can be deposited with a powdered or liquid polymer in order to form the composite product. U.S. Pat. Nos. 5,310,582 to Vyakarnam and Drzal and 5,102,690 to Iyer, Drzal and Jayaraman describe a method and apparatus for aerosolizing a powder using a vibrating means, such as an acoustic speaker, which can be used in the present invention and which is incorporated herein by reference.

The feeder preferably moves the fiber across a planar surface to align them in one direction which is parallel to a slot leading between the plates provided with the electrical field. This is preferably accomplished with a vibrator which moves the surface which is inclined towards the slot in a horizontal direction and by providing aligning ridges periodically along the surface and parallel to the slot to aid in aligning the fibers.

The plates providing the electrical field are preferably charged at 100 to 600 kilovolts per meter of spacing between the plates. The voltage depends upon the fibers used. Above about 600 kilovolts corona discharge occurs; below 100 kilovolts there is not sufficient E-field. Preferably, the electrical field is produced by an alternating current (AC) source.

The fibers are deposited on a surface preferably a conveyor. The conveyor can move back and forth or it can move in one direction or a combination of these movements can be used. All of this is well known to those skilled in the art.

Figure 6:
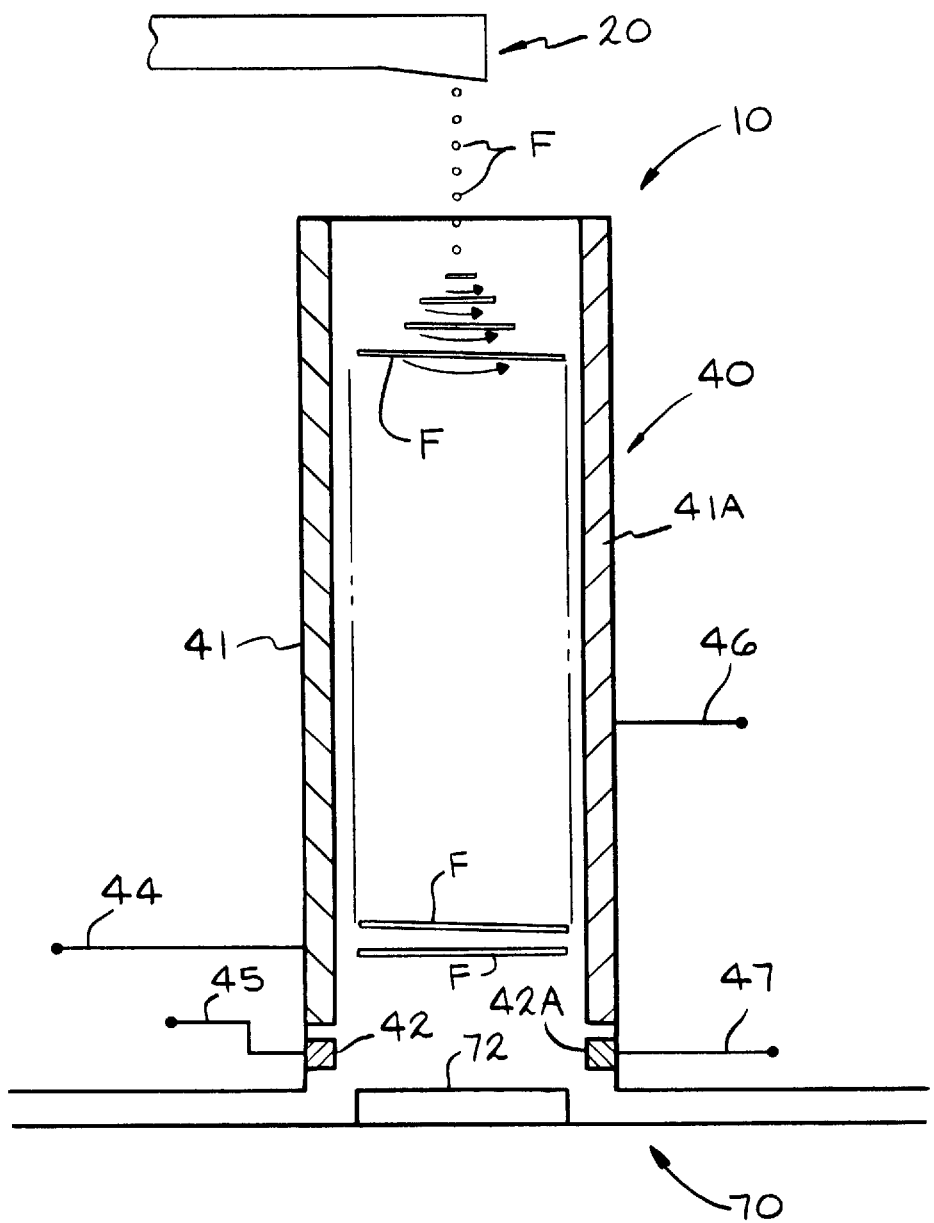
FIG. 6 is a schematic cross-sectional view of a feeder apparatus 20 and alignment apparatus 40 showing the rotational movement of the fibers F by the electrical field as they drop to the bottom of the alignment apparatus.
Figure 6A:
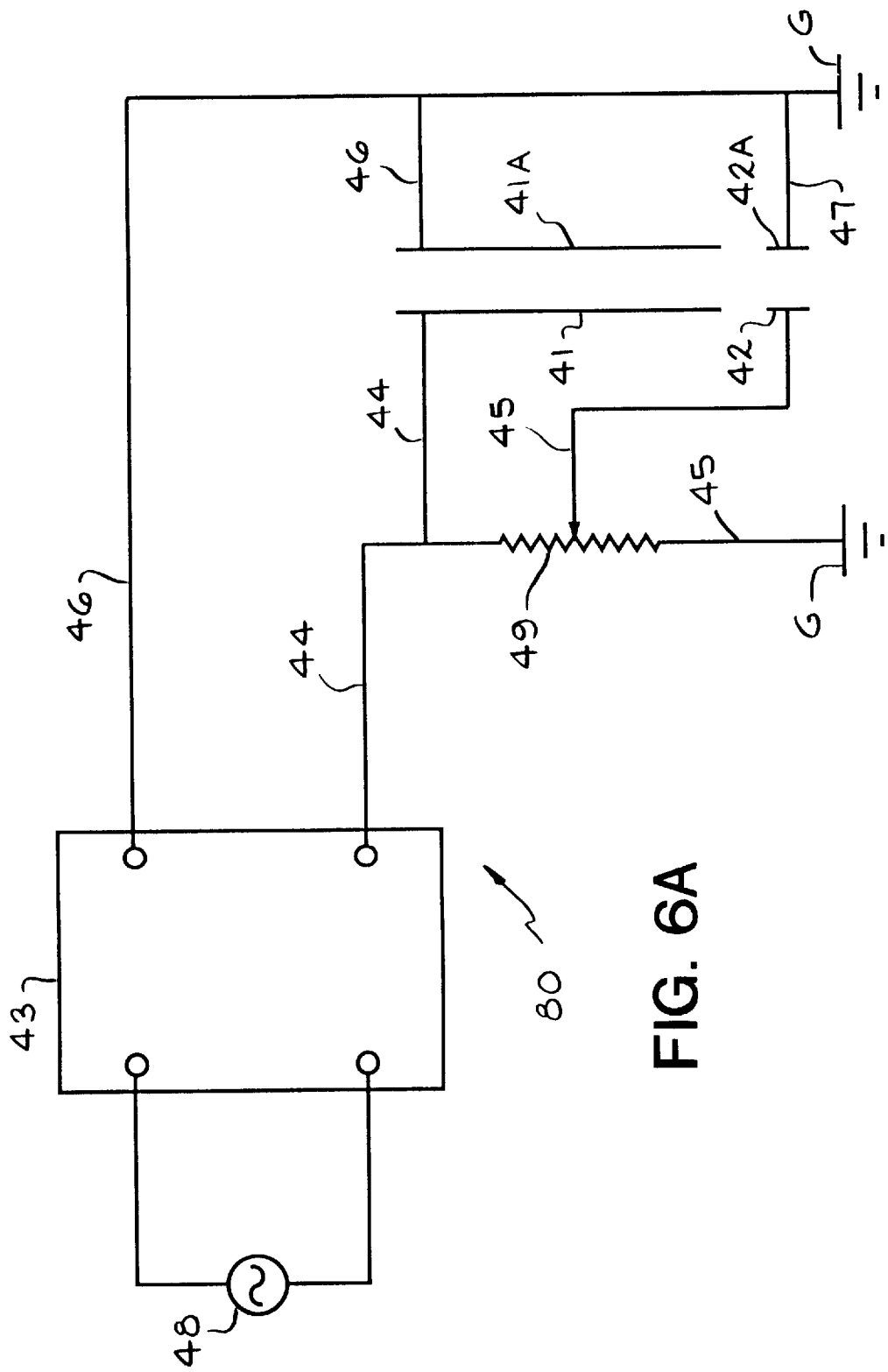
FIG. 6A is a circuit diagram 80 for providing a voltage between electrical plates 41 and 41A and neutralizing field between the bottom edge of 41 and 41A and the top edge of 42 and 42A.

FIGS. 1 to 6 and 6A show a preferred apparatus 10 of the present invention including a feeder apparatus 20 (FIG. 2), an alignment apparatus 40 for orienting the fibers F, and a conveyor apparatus 70 for supporting the deposited fibers F. FIG. 6 is a schematic view of selected of the parts of the apparatus 10 as shown in FIG. 1, schematically showing the orientation of the fibers F by the alignment apparatus 40 from the feeder apparatus 20. FIG. 6A is a circuit 80 for the apparatus 10 of FIG. 1.

The feeder apparatus 20 includes a specially designed tray 21 with an oscillator 22 which is magnetically operated (FMC, Homer City, Pa.) which produces high frequency oscillations of the tray 21. The tray 21 is supported on the oscillator 22 by legs 23 and 23A connected by arm 24 to one of the legs 23A. The tray 21 is provided with a series of parallel ridges 25 and is inclined towards a slot 26 which is parallel to the ridges 25. The entrance 26A to the slot 26 forms an elongate funnel to direct the fibers F (FIGS. 2 and 5) towards and through the slot 26. The tray 21 includes spaced apart vertical side walls 27 on opposed sides of the tray 21, an end wall 28 and a bottom 29 with the ridges 25. The tray 21 has an angle of incline down towards the slot 26 of about 5 degrees. As can be seen, the fibers F have an orientation after passing through the slot 26 of the longitudinal long axis which is approximately horizontal and parallel to the plane of the plates 41 and 41A as shown in FIG. 4.

Figure 4:
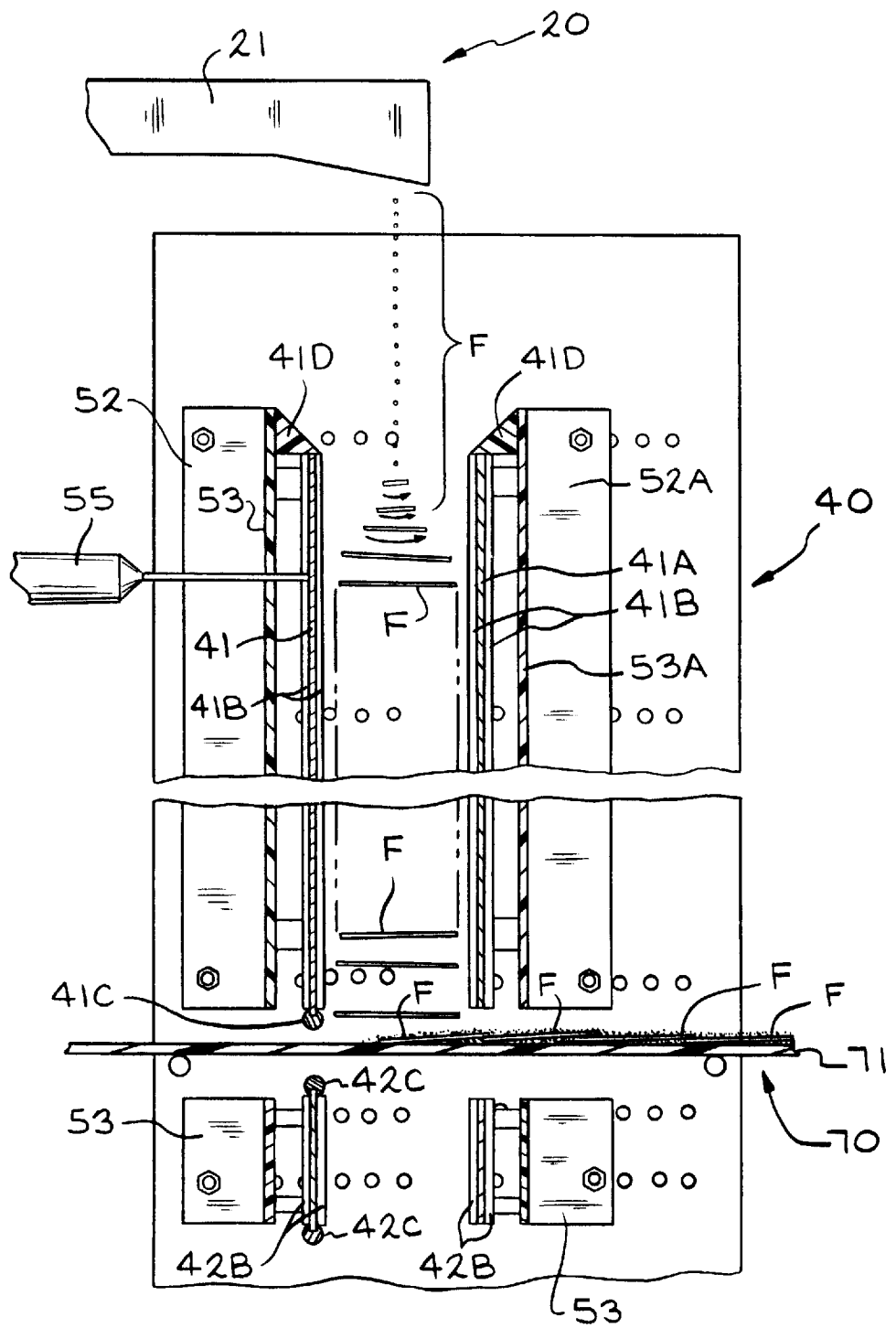
FIG. 4 is a cross-sectional view along line 4—4 of FIG. 3 particularly showing the alignment of the fibers F from the feeder apparatus 20 by the electrical field between the parallel plates 41 and 41A.
Figure 5:
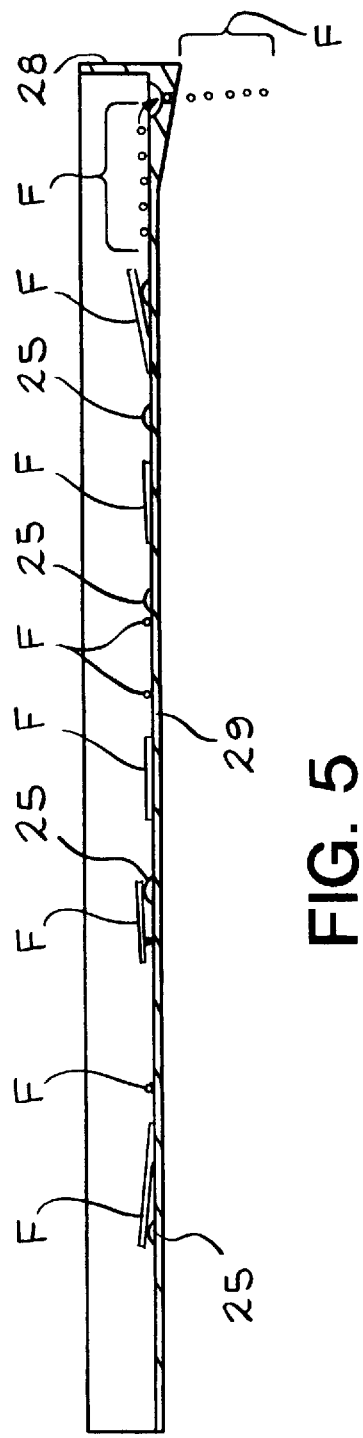
FIG. 5 is a front cross-sectional view along line 5—5 of FIG. 2 showing the ridges 25 in tray 21 of the feeder apparatus 20 for aligning the fibers F.

The alignment apparatus 40 is particularly shown in FIGS. 1, 3, 4, 6 and 6A. FIG. 6 shows spaced apart parallel aligning plates 41 and 41A which are provided with an electrical field by circuit 80. Neutralizing fields are provided by neutralizing field plates 42 and 42A. The fields for plates 41 and 41A and 42 and 42A are supplied by a voltage source 43 (FIG. 6A). As shown in FIG. 6A, the plates 41A and 42A are grounded G; however, the plates 41 and 42 could be grounded G and the plates 41A and 42A could be charged. Wires 44, 45, 46, 47 are provided to plates 41, 42, 41A and 42A to provide the electrical connections. As can be seen from FIG. 6, the fibers F are re-oriented in a horizontal plane parallel to the drawing and perpendicular to the plates 41 and 41A by the electrical feed between plates 41 and 41A. In reality the fibers may be tilted at an angle along the longitudinal axis and FIG. 4 is merely schematic.

FIG. 6A shows more detail for the electrical circuit of FIG. 6. A source 48 of alternating circuit is transformed by voltage source 43. A variable resistance or voltage divider 49 is provided for reducing the voltage to plates 42. In the preferred embodiment the AC source 48 is at 120 volts and 60 Hz so that the AC voltage source provides 25 KV at 15 mAmps. The voltage divider is variable between 0 and 25 KV in providing a voltage between plates 42 and 42A. The E-field intensity between the electrode plates is varied by controlling the AC voltage source 48. A standard VARIAC is used to control the source 48.

FIGS. 1 to 4 show the alignment apparatus 40 in more detail. Transparent insulating shields 50 and 50A and 51 and 51A made of plexiglass (acrylic) are provided to support the plates 41 and 41A and 42 and 42A which mount by means of pegs (not shown) in holes 50B. Angled members 41D provide an entry between the plates 41 and 41A. Insulating shields 41B and 42B (FIG. 4) cover the plates 41, 41A, 42 and 42A. The holes 50B allow for adjustment of the horizontal spacing of the plates 41 and 41A and 42 and 42A. The plates 41 and 41A are mounted on insulating supports 52 and 52A by means of insulating posts 54. Insulators 53 and 53A mount the posts 54. Cylindrical rods 41C and 42C are provided to help minimize the field intensity at the ends of plates 41 and 42, and between plates 41A and 42A. A voltage probe 55 is connected to a multimeter 57. Box 56 is connected to motor 76 for the conveyor 71. Wires 58 and 59 are connected to and from box 60 to the oscillator 22 and power supply. A variable switch 60A from oscillator 22 is provided, as is an on-off toggle switch 60B. VARIAC 61 provides variable AC voltage from power source P to high voltage transformer 43.

Conveyor apparatus 70 is shown in detail in FIGS. 1, 2, 3 and 4. A standard tape conveyor 71 moves back and forth in a horizontal path which is about 9 inches (22.5 cm) wide so that the aligned fibers are deposited on sheet 72 mounted on supports 73 and 74 and base 75. Motor 76 is controlled by controller 56 and connected by wire 78.

FIG. 7 shows an apparatus 100 for forming a composite product 101 as shown in FIG. 8. The composite product includes fibers 102 in a resin matrix 103 laminated between non-conductive release or non-release veil or polymer film sheets 104 and 105. The fibers 101 are aligned parallel to the conveyor apparatus 170 by feeder apparatus 120 and alignment apparatus 140. The conveyor apparatus 170 moves the aligned fibers 102. A mixture of discontinuous fibers 101 are fed to a hopper 121 and through opening 122. The fibers 102 are mixed with a powdered resin 106 which is aerolized by a vibrator 123 in chamber 124 as described in U.S. Pat. No. 5,310,582 to Vyakarnam and Drzal and fed into tray 125 by chute 126. Excess resin powder, that is not adhering to the fibers is prevented from entering the alignment apparatus 140 by filtering the resin out in the initial portion of tray 126 through a perforated screen 128 in the tray 125 into a dust collector unit 129. This filtered out resin is subsequently recycled back into the process stream. Tray 125 is provided with multiple slots each leading between plates 141, 141A, 141B, 141C, 141D and 141E of alignment apparatus 140, which are similar to plates 41 and 42. The number of multiple slots is chosen based on the thickness of the final composite sheet and the production rates required.

The conveyor 170 includes a belt 171 on rollers 172 and 173 which move the sheet 105 through the aligned apparatus to receive the particles 106 coated on the fibers 102. The sheet 105 is fed from roll 107. The powder particles 106 and fibers 102 are heated by heater 174 to sinter them. A second roll 108 provides the sheet 104 which is laminated with the fibers 102 and resin 103 to form a composite 101 by roller pairs 175 and 176. The composite 101 can be further compressed with heat and pressure between belts 177 and 178 on drive rollers 179 and 180 to form a more compressed composite 101A.

FIG. 9 shows an apparatus 200 which is used to form a composite product 201 with fibers 202 and 203 and resin 204 and 205 forming separate layers laminated between sheets 206, 207 and 208. Dual feeders 220 and 220A feed the fibers 212 between plates 221A and 221B and plates 221C and 221D onto the sheet 208 which is fed from roll 209 and the sheet 207 which is fed from roll 210. The layer 204 is then covered by the sheet 206 from roll 211. The laminate is fed to belts 271 and 272 on wheels 273 and 274 to form the composite product 201. A conveyor belt 275 on rollers 276 and 277 moves the sheet 208.

Conductive as well as dielectric fibers can be aligned in an electric field as long as there is polarization of the fiber, which can be achieved when there is a difference between the dielectric constants of the fiber and the medium surrounding it. Both direct current (DC) and alternating current (AC) fields were evaluated to orient fibers. In DC fields, it was found that glass fibers charged and migrated to one electrode under a strong electrophoretic force which disturbed any alignment achieved. Based on this observation and the fact that polarization times for the dielectric fibers are of the order of $10^{-4}$ seconds or less, it was concluded that an AC field is the better choice for alignment of fibers. Since the polarization times are very low, one can orient fibers at a frequency of 60 Hz.

The ADF process development required the control of fiber orientation and a determination of the various parameters that influence it. An experimental setup was built to study the orientation behavior of fibers in electric fields of the apparatus of FIG. 1. A variety of glass fibers of lengths ranging from 1/8" to 2" (0.3 to 5 cm) have been experimented in this setup. In principle, the experimental station consists of a parallel plate electrode geometry with provision for recording and analyzing the fiber motions. A high speed video camera and Kodak EktaPro EM high speed motion analyzer is used to study the electro-dynamics of fiber motions. The key parameters investigated are the fiber alignment times, fiber settling behavior and fiber orientation distributions (FODs).

The analytical model derived by Demetriades (J. Chem. Phys. 29:154 (1958); and Arp. P. A., et al., Advances in Colloid and Interface Science, Vol. 12:295–356 (1980)) to determine the alignment time (t) for an elliptical body to orient from an initial angle $\theta_i$ to $\theta_f$ along the electric field lines of intensity $E_O$ is given by the following equation.

$$t = \frac{\mu_m}{8\pi\epsilon_o\kappa_2 E_o^2 P(q, r_e)} [\ln(\tan\theta_r) - \ln(\tan\theta_i)]$$

Figure 11A:
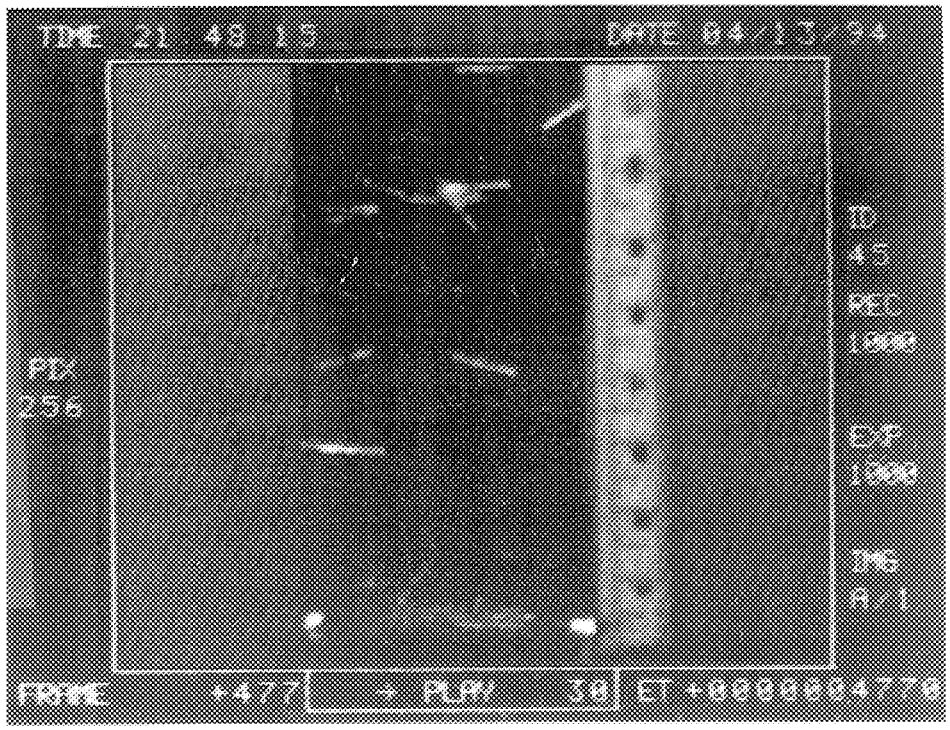
FIGS. 11A and 11B show high speed videographs of ½ inch long chopped E glass fibers setting in the orientation chamber between plates 41 and 41A of FIG. 1 as in Example 1.
Figure 11B:
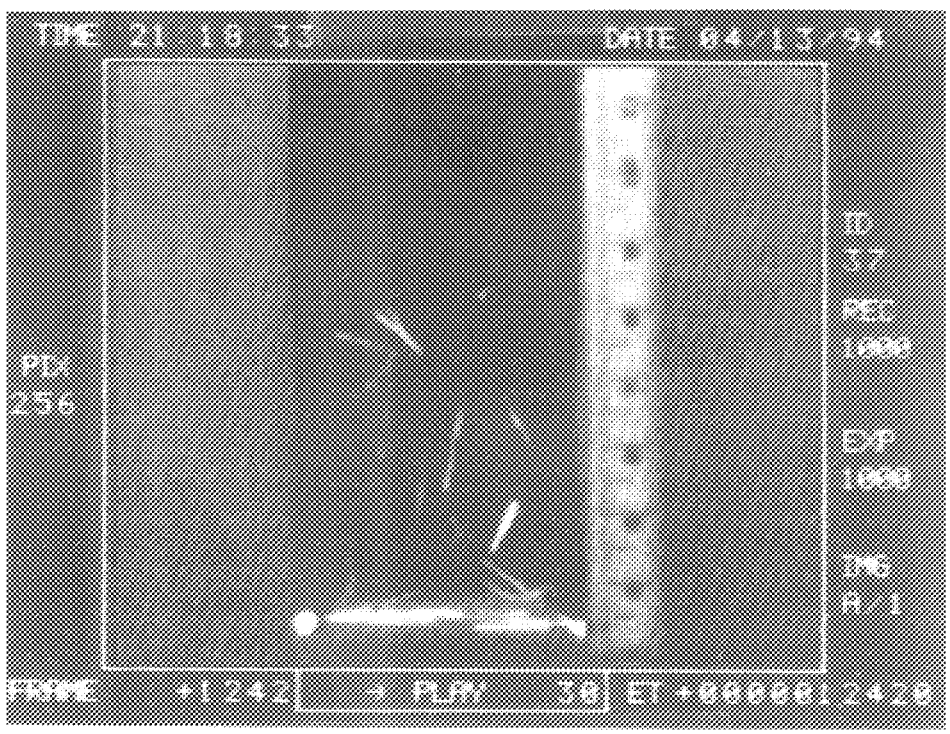

This relationship shows that the alignment time is a very strong function of E-field intensity and the polarization function P. P is in turn related to the ratio of dielectric constants of the fiber and the medium and the aspect ratio. Better fiber alignments are possible at higher $E_O$. However, it is to be noted that this equation can only serve as a first approximation to determine the alignment times of the fibers that can be used in the ADF process. This is because the equation is valid for fiber motions in the viscous flow regime (implying very small fibers or a very viscous medium), while the glass fibers that were used were relatively large. Besides, the fluid medium being air results in fiber motions that lie beyond the viscous flow regime. This led to the development of a working model to predict alignment times for the fibers that can be used in the ADF process. Glass fibers of lengths ranging from 1/8" to 2" with and without polymer powder impregnation have been successfully aligned in the experimental setup, as they settled in the orientation chamber. High speed videography (1000 frames/sec) and FODs of fibers deposited on the deposition plate confirmed high degree of fiber alignment in A.C. fields of intensities 300 KV/m and greater (FIGS. 11A and 11B).

Based on the experiments conducted on the experimental setup and the theoretical analysis, a prototype process was designed and developed that can manufacture aligned discontinuous fiber mats in both batch mode as well as continuous mode. The alignment times of fibers were estimated to determine the dimensions of the orientation chamber.

The mode of impregnating polymer matrix on fiber was by bringing in contact an aerosol of fine tribo-charged polymer powder and fibers, to provide a uniform coating of particles on the fiber. Acoustic aerosolization is an effective means to generate an aerosol of fine polymer powders of sizes less than 30 microns (Iyer, S. R., et al., Powder Technology 57(2), p 127–133 (1989)). This aerosol is entrained through a nozzle where the fibers are introduced. The amount of matrix or binder that was deposited on the fibers was controlled by controlling the particle concentration flux in the aerosol, which is directly related to the matrix volume fraction in the composite. It is important to note the uniform distribution of polymer particles around the fibers (FIGS. 12A and 12B) required the polymer to flow only locally over small distances, thereby reducing the polymer melt flow times during the compression molding step (Padaki, S., et al., "Development of a Process and Consolidation Model for Powder Prepreg Composites", Proc. 10th. Annual ASM/ESD Advanced Composites Conference & Exposition, Dearborn (1994)). This improves matrix impregnation, minimized void formation during consolidation and improved the mechanical performance of the part. Powder impregnation makes compression molding of the ADF mat into a final composite part a rapid step.

Dry powder impregnated fibers of lengths greater than the critical fiber length were generated and fed into the electric field orientation chamber in a controlled manner as in FIG. 1. There was a maximum concentration of fibers that could enter the orientation chamber in order for the E-field to effectively orient the fibers. The maximum rate of production using the ADF process is a function of the critical fiber concentration ($C_f$) in the orientation chamber. This concentration $C_f$ is in turn related to the aspect ratio of the fiber and the fiber orientation state. The lowest $C_f$ is when the fiber orientation state is in a 3-dimensional random state. However, the fibers were fed in a predominantly planar fashion. This predominantly planar orientation state of the fibers increased the $C_f$ compared to the random state. The orientation chamber dimensions were designed such that the suspension of impregnated short fibers settle under terminal conditions in a predominantly planar horizontal orientation before coming under the influence of AC electric fields of frequency 60 Hz. A combination of E-field intensity and the processing conditions unique to the process, resulted in the ability to control the fiber orientation distributions of the ADF mat that was formed on the moving veil at the bottom of the orientation chamber. The ADF mat formed on the moving veil was subjected to heat to retain its integrity. The ADF process can operate under continuous mode to make a uniformly thick ADF mat or in a batch mode to lay up the fibers in a 3 dimensional orientation sequence which can be compression molded to a composite part.

The ADF processing methodology offers a solution to the problem of reducing the cycle time in the fabrication of an aligned discontinuous structural composite and lends itself for a highly automated process for the following three reasons:

(i) controlled powder impregnation of the matrix gives immense flexibility in the fiber volume fractions that can be obtained and eliminate the additional step of resin transfer molding as the case would have been if a preform is the final product of the process;

(ii) a simple and rapid orientation technique using electric fields; and (iii) by incorporating a technique to increase the concentration of fibers that can be processed in the orientation chamber, thereby increasing the production rate.

The prototype in Example 1 has a rated capacity of manufacturing 2 lbs/hr of ADF mat. Conventional scale up factors, i.e. increasing the width of the orientation chamber from the existing 8 inches (20.3 cm) to the desired width and using multiple orientation chambers to build up ADF mat rapidly result in direct increases in production rates. These scale-up factors can be directly applied to the process without affecting the principle of operation in any way.

The following are Examples illustrating the method of the present invention.

EXAMPLE 1

Processing Aligned and Random Discontinuous Fiber Composites Using Polymer Powder Coating and E-Fields Materials The fiber-matrix system chosen for verifying the properties of composites produced using the ADF process was chopped E-glass fibers of four different lengths ⅛, ¼, ½ and 1 inch supplied by Owens-Corning Fiberglas (Granville, Ohio); and nylon 12 (ORGASOL) powder matrix with a mean particle size of 10 microns supplied by Atochem (Elf Atochem North America, Inc., Philadelphia, Pa.).

Processing Conditions

For each fiber (F) length, aligned discontinuous fiber (ADF) panels were fabricated under two modes: (i) random orientation of fibers which provided the base-line case for comparison; and (ii) aligned fibers using E-field of intensity 400 KV/m (FIGS. 13A–13D). In order to fabricate an aligned discontinuous fiber panel, measured quantities of fiber (34.5 g) and the matrix powder (20.7 g) were used to make a composite with a final fiber volume fraction of 40%. Each ply was fabricated by continuously feeding the fibers and letting them fall through the alignment apparatus of FIGS. 1 to 6A with the preferred fiber orientation (also see FIGS. 11A and 11B). The oriented fibers were deposited on a TEFLON release film placed on sheet 72 which traverses back and forth, until the desired thickness is achieved. This mat of fibers was then uniformly sprayed with the nylon 12 powder and later exposed to an infra-red strip heater (not shown) that sintered the particles in place making the ADF composite more handleable. ADF composite plies were stacked up and processed using the consolidation cycle described below.

Composite Fabrication

ADF composites that were produced in the method were carefully transferred to a compression molding caul plate, without disturbing the fiber orientation distribution. A known number of plies were stacked up depending upon the final thickness of the composite part desired. Vacuum assisted compression molding was performed in a instrumented Carver Press (Fred S. Carver, Inc., Menomonee Falls, Wis.) to make a part with minimum voids. Polymer matrix material was characterized using differential scanning colorimetry (DSC) to determine thermal transitions and rheometrics to determine the polymer melt shear viscosity, before formulating the consolidation cycle. For making composites with a 40 volume fraction fibers, the consolidation cycle consisted of heating the plies to 200° C. with vacuum applied starting at 100° C. A pressure of 100 psi was applied at the point when the temperature reached 100° C. in the heating cycle until the end of the cycle. The part is held at 200° C. for 5 minutes to ensure complete consolidation and then rapidly cooled to room temperature to minimize crystallization. This consolidation cycle gave consistently good quality composites with minimal resin bleeding. It was verified that the fiber orientation distribution (FOD) of the ADF mat was not disturbed during the consolidation process.

Mechanical Testing

The mechanical properties of ADF composites were determined by conducting tensile tests using ASTM D638. The composite panels, prepared as described earlier, were cut into dog bone specimens using a $CO_2$ laser source of 360 Watts operated at a cutting speed of 30"/min. The specimens were then carefully cleaned from the edges to avoid any crack initiation during the test. When comparing the properties it should always be noted that the compatibility of the proprietary polyester sizing on the glass fibers and the nylon 12 matrix was unknown. It may be possible to obtain better properties if a sizing more compatible with the matrix is used.

TABLE 1

Effect of Fiber Alignment on the Mechanical Properties of Discontinuous Fiber Composites

| Fiber Length | Tensile Modulus (Msi) | | Tensile Strength (psi) | |
|---|---|---|---|---|
| | Random | Aligned | Random | Aligned |
| 1/8" | 0.93 | 1.58 | 6,330 | 9,990 |
| 1/4" | 1.10 | 1.77 | 9,580 | 15,640 |
| 1/2" | 1.16 | 2.98 | 14,290 | 23,870 |
| 1" | 1.32 | 2.60 | 17,740 | 32,950 |

Effect of Fiber Alignment

The effectiveness of fiber alignment is very clearly reflected by the performance of ADF composites compared to the random base line cases for all the fiber length cases (Table 1). Improvements due to fiber alignment range from 70% to 97% in the stiffness values and 58% to 86% in the strength values. The tensile properties follow expected trends as a function of fiber length. Table 2 summarizes the improvements obtained in the tensile properties of ADF composites, due to fiber alignment. Improvements in stiffness range from 60.9% to 97%, while improvements in strengths range from 57.9% to 85.7%. It was concluded that if modulus is the primary selection criteria then fiber orientation becomes very critical and the length of the fiber plays a secondary role. On the other hand when strength values need to be high a combination of good fiber alignment, long fiber length along with the use of a properly compatible fiber sizing, yielded better strength properties in ADF composites.

Effect of Fiber length

Figure 15:
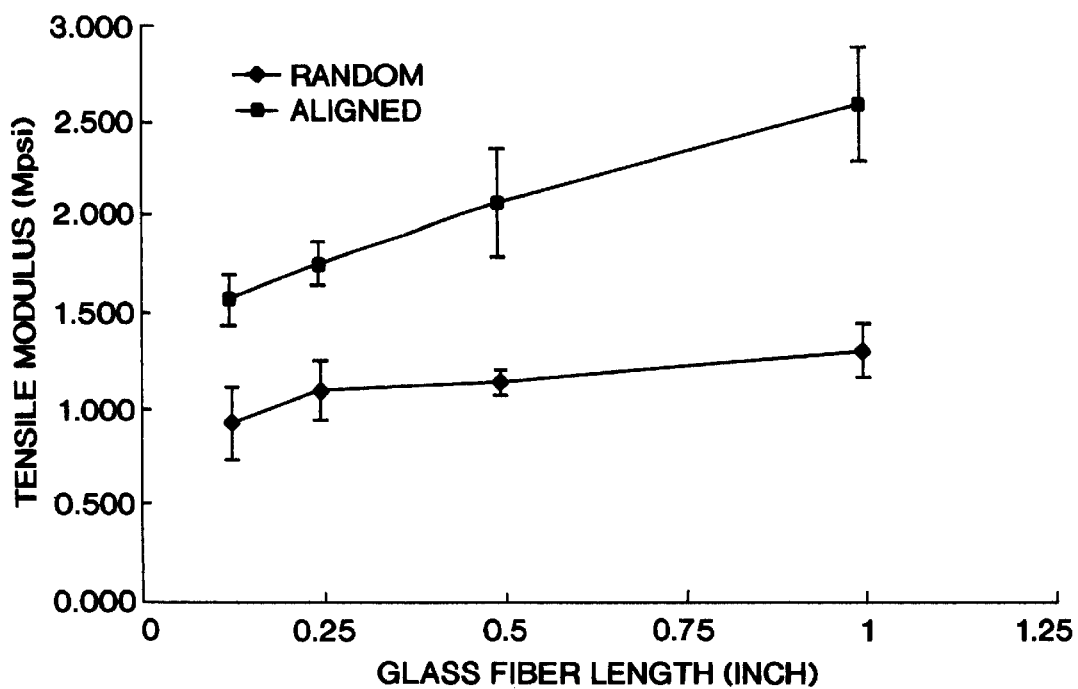
FIG. 15 is a graph showing the effect of fiber alignment on modulus of glass-fiber-nylon 12 ADF composites ($V_F$ of fibers is about 40%).

Theoretical predictions using the simplest case of a plastic material surrounding a reinforcing fiber, estimate that when the fiber length increases to about 10 times the critical fiber length in a perfectly aligned discontinuous fiber composite, the modulus and strength values approach that of unidirectional continuous fiber composite of the same fiber volume fraction (Agarwal, B. D., et al., "Analysis and Performance of Fiber Composites", John Wiley & Sons 71–103 (1993)). Observing the modulus vs fiber length data (FIG. 15) the conclusion was that the modulus values were approaching asymptotic values when the fiber length increases from 1/8" to 1". The properties of random discontinuous fiber composites tended to level off from a fiber length of 1/2 inch onwards, while aligned discontinuous fiber composites had an increasing trend even at the fiber length of 1 inch. The effect of fiber length was very dramatic in the case of strength values with an increase of about 300% when the reinforcing length of the fibers increased from 1/8" to 1". This was because in the case of composites with smaller length fibers, there is a higher density of fiber ends or stress ends which results in composite failure at low stresses.

TABLE 2

Performance Improvements Due to Fiber Alignment in ADF Composites ($V_f$ = 40% approx.)

| Fiber Length (inch) | Strength Improvement (%) | Stiffness Improvement (%) |
|---|---|---|
| 0.125 | 57.9 | 69.9 |
| 0.25 | 63.3 | 60.9 |
| 0.5 | 67.0 | 79.3 |
| 1.0 | 85.7 | 97.0 |

EXAMPLE 2

Processing Aligned and Random Discontinuous Fiber Composites Using Polymer Film Impregnation and E-Fields A moving veil with a layer of the polymer matrix film can be passed through the alignment apparatus 40. The deposited fibers can then be covered with another layer of the polymer film and heat treated to form a handleable composite or laminate with the desired fiber orientation. The thickness of such a material can be built by a series of alignment apparatus as shown in FIGS. 9 and 10 and later compression molded, typical of a sheet lamination process to form a composite sheet. The consolidation cycle needed to process these composites is the same as described above for the same polymer matrix.

EXAMPLE 3

Processing of Microstructure Controlled Hybrid Discontinuous Fiber Composites

Fiber Orientation Distribution

One of the objectives of developing the ADF process was to demonstrate the capability of making ADF composites with controllable fiber orientation distributions (FODs). The method utilized in obtaining the FOD consists of running the ADF process under the same conditions as one would to manufacture a composite but this time not with the intention of making a composite but recording a series of digital images using a Panasonic CCTV. A number of images of the fibers that are deposited on the TEFLON release film were taken to give a statistically significant FOD. Global Lab image analysis software (Data Translation, Inc., Marlboro, Mass.) was used to identify fibers and determine their orientations in each image. Using the above, method a series of FODs were obtained for each of the chopped glass fiber mats that were produced under the two conditions: randomly oriented and aligned in the E-fields. Control of fiber orientation is by a combination of factors: electric field intensity and the hydrodynamics of fiber motion. Fiber dielectric constant and the fiber geometric dimensions are the two most important material properties that affect the degree of orientation and the alignment time in air. It had been discovered that with a careful combination of the geometric and the conductivity parameters, one can achieve different degrees of fiber orientation when subjected to the same E-field conditions. Fiber orientation distributions were obtained from a number of digital images for ¼" and 1" long fibers at different E-Field conditions. These FODs were further statistically reduced to a fiber orientation parameter fp. A fp value of 1.0 indicates perfectly aligned and a fp value of 0.0 is perfectly random, while a fp of 0.5 may be considered as moderately aligned. For example, at an E-field intensity of 300 KV/m, it has been found that 1" fibers can get highly aligned but ¼" fibers are not even moderately aligned (Table 3). Numerous other combinations can be designed depending on the properties of the fibers and the desired effect needed in the final composite.

TABLE 3

Effect of Fiber Length and E-Field Intensity on the Degree of Fiber Orientation Distribution

| E Field Intensity, KV/m | fp for ¼" Glass Fibers | fp for 1" Glass Fibers |
| --- | --- | --- |
| 0 (Random Case) | 0.04 | 0.07 |
| 300 | 0.39 | 0.69 |
| 400 | 0.58 | 0.73 |
| 500 | 0.65 | 0.76 |

Hybrid Composite Processing

A mixture of ¼" and 1" fibers, with the same electrical conductivity fall through the same orientation chamber but were aligned to different degrees of orientation as indicated in Table 3. These hybrid composites can then be fabricated using the same consolidation techniques as described above in Examples 1 and 2. This effect has numerous advantages when a material form has to be fabricated that needs physical properties like thermal, electrical and mechanical to be different in the three different axes.

Figure 12A:
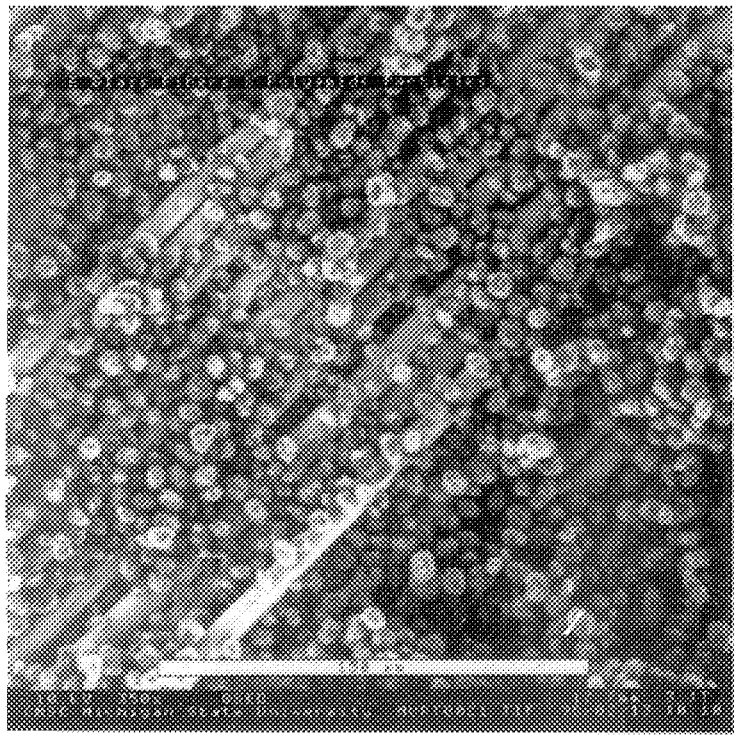
FIGS. 12A and 12B are scanning electron micrographs of chopped E-glass fiber coated with 10 micron nylon-12 powder (FIG. 12A) and uncoated (FIG. 12B) as in Example 1.
Figure 12B:
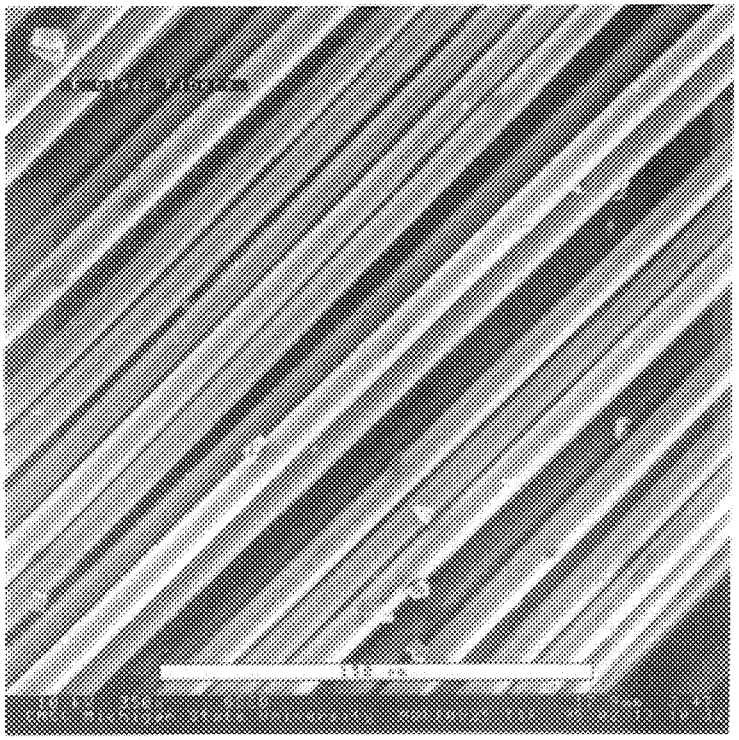
Figure 13A:
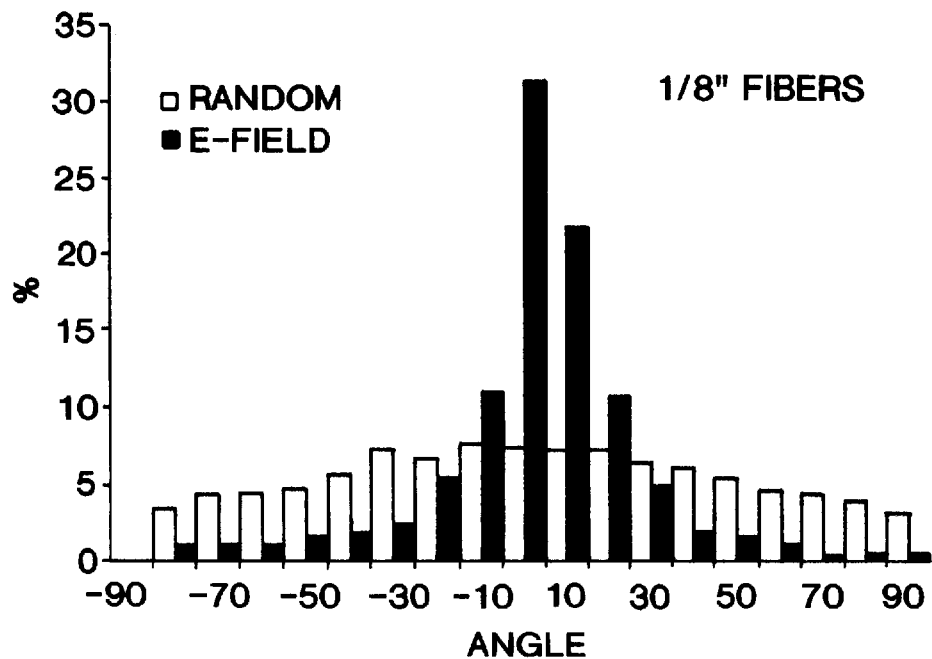
FIGS. 13A to 13D are graphs showing fiber orientation distributions of aligned (E-field 400 KV/meter (black lines) and without the E-field with randomly oriented fibers (open lines) as in Example 3.
Figure 13B:
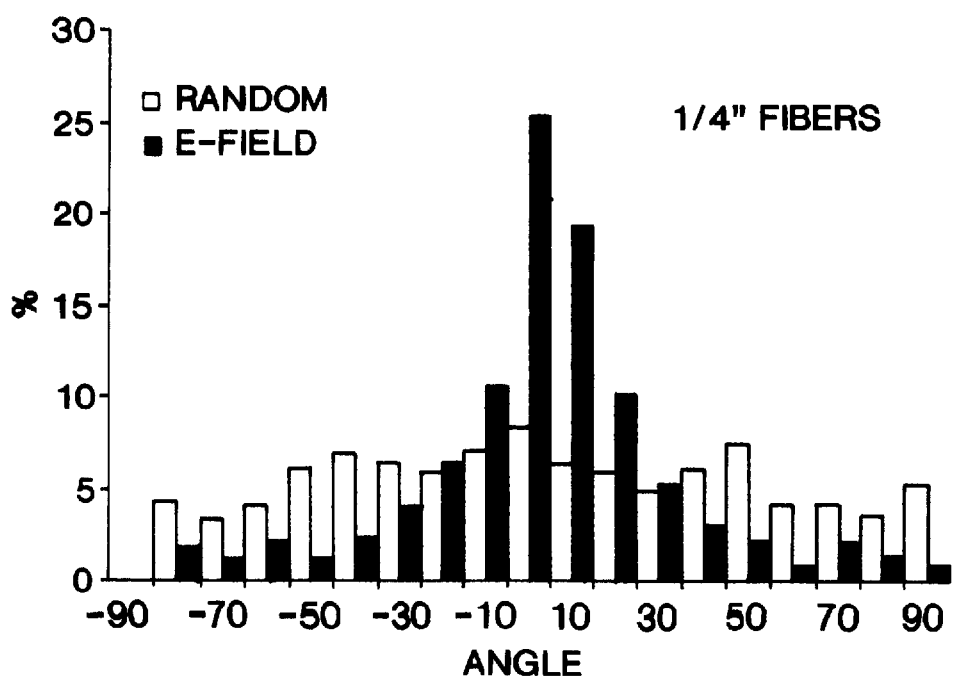
Figure 13C:
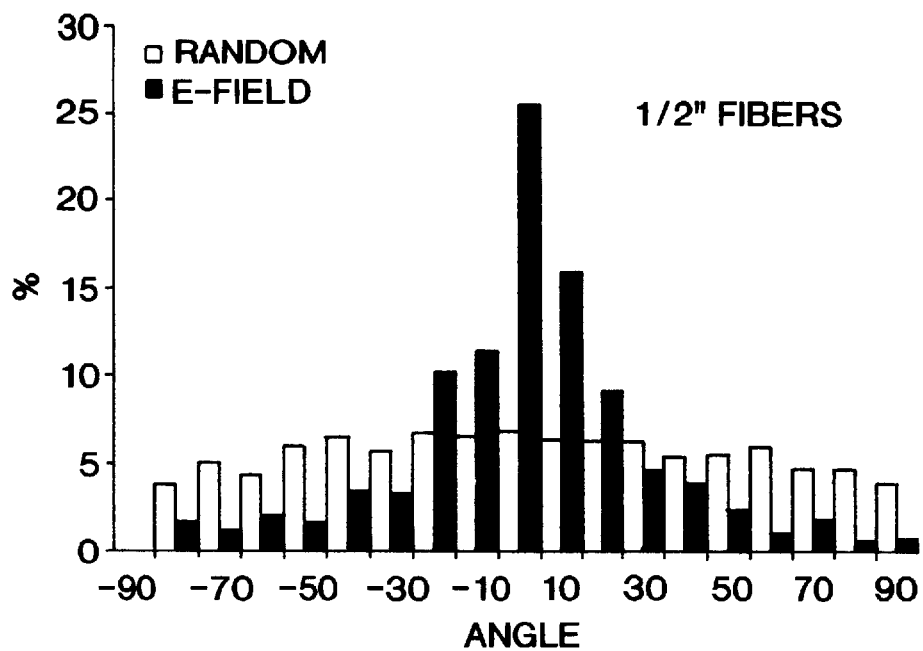
Figure 13D:
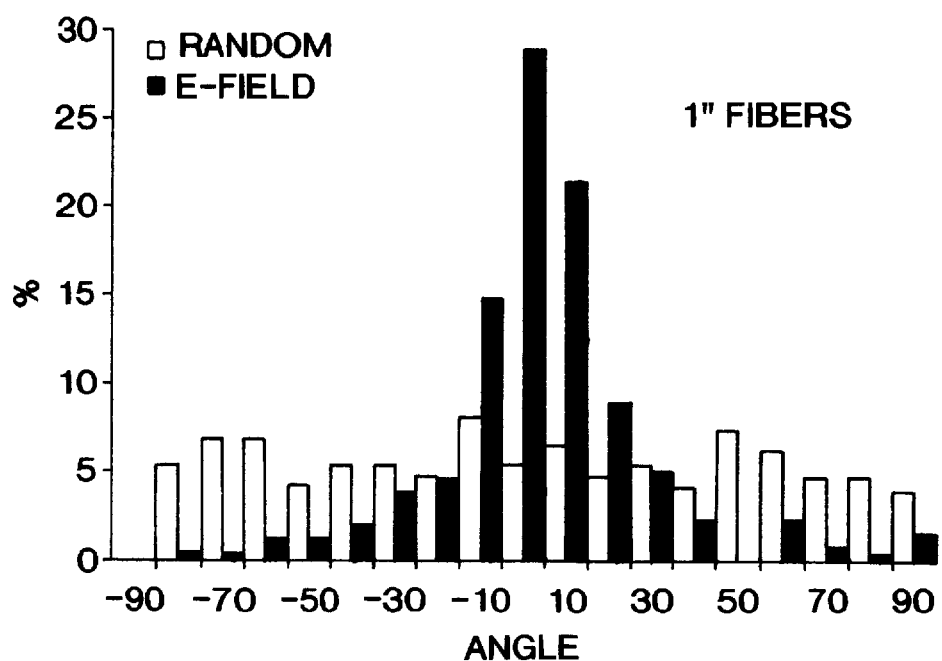
Figure 14:
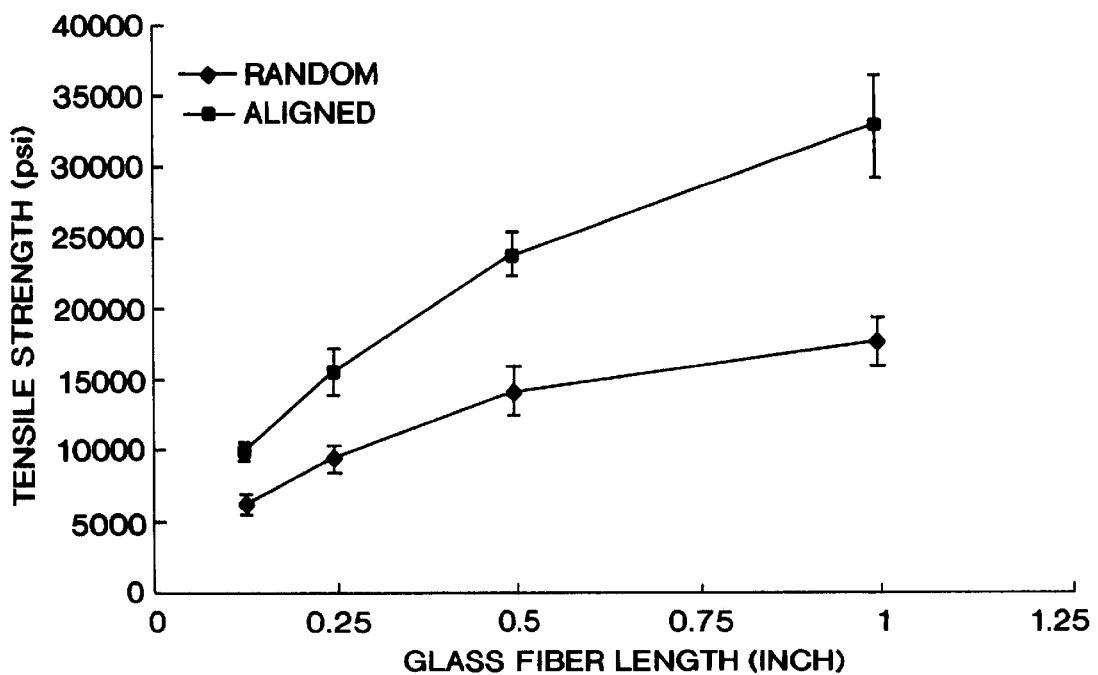
FIG. 14 is a graph showing the effect of fiber alignment on tensile strength of glass fiber nylon-12 ADF composites (Volume fraction ($V_f$) of fibers is about 40%).

In Examples 1 to 3, a novel high speed and low cost process was developed to manufacture aligned discontinuous fiber composites using electric fields. It has been demonstrated that the orientation of dielectric fibers like glass fiber bundles (with and without polymer powder coating) can be effectively controlled using electric fields (FIGS. 12A and 12B). ADF composites made of glass fibers and nylon-12 matrix provide significant improvements in stiffness and strength properties with fiber alignment. ADF composites made with engineering thermoplastics offer the stiffness to weight ratios typical of high performance continuous fiber composites, the versatility of thermoplastics and the durability and formability of sheet metals rank them higher than the non-recyclable thermoset based SMC and SRIM composites (Nichols, D., "Glass-mat Thermoplastics Form Structural Parts", Advanced Materials & Processes, 10, p. 29–32 (1994)). The ADF composites process addresses the need for a process that can manufacture lightweight, low cost structural materials for the automotive and durable goods industry.

The method provides the following:

1. A simple yet effective design of the orientation chamber for controlling fiber orientation in air. Three unique techniques were incorporated in the design of the orientation chamber to counter the edge effects of the electric fields when it comes in contact with the fiber mat that was being laid up during continuous processing of ADF composites.

(i) Created an equal and opposite field under the high voltage electrode by placing another set of electrode or plates 42 and 42A under the moving slide/mat/veil. The plates 42 and 42A neutralize the edge effects of the high voltage electrodes or plates 41 and 41A, which otherwise disturb the fiber orientation of the fibers that are aligned by the E-Field and that are deposited on the mat.

(ii) The bottom electrodes 42 and 42A were offset with respect to the top electrodes to create E-field lines at an angle which helps in landing the fibers on the moving slide/mat/veil with minimum bouncing.

(iii) Designed the edges of the electrodes which are closer to the moving mat with a conductive cap or rod 41C which has a cylindrical cross-section with a relatively large radius of curvature. The cylindrical edge reduced the effective E-Field intensity at the edge, thereby reducing the edge effects and minimizing E-Field breakdowns.

2. Control of fiber orientation was by a combination of factors: electric field intensity and the hydrodynamics of fiber motion. Fiber geometric dimensions and the fiber dielectric constant are the two most important material properties that effect the degree of orientation and the alignment time in air. Conductive (e.g. carbon) as well as non-conductive fibers (e.g. glass, aramid and other polymeric fibers) can be aligned by the ADF process. Fiber with and without polymer powder impregnation can also be aligned in the ADF process. In the ADF process no pre-treatment of fibers is necessary in aligning the fibers even non-conductive glass fibers.

3. Developed a unique vibratory fiber feeder apparatus 20. Fibers with or without powder impregnation can be fed into the orientation chamber without entanglement. Fibers falling from the feeder apparatus 20 tend to fall with a planar orientation instead of a three dimensional random state which makes them align faster in the direction of the electric field between plates 41 and 41A. Thus the feeder apparatus 20 indirectly improves the effectiveness of orientation chamber.

4. Polymer powder coating of the fibers and thereby controlling the matrix volume fraction in the final composite is one of the biggest advantages of the ADF process. The combination of powder coating with electric field alignment makes the method a high speed-low cost process for making aligned discontinuous fiber composites. This step eliminates the additional step of resin transfer. The technology of powder coating is well established in the group and extensively patented (U.S. Pat. Nos. 5,123,373 to Iyer, Drzal and Jayaraman and 5,310,582 to Vyakarnam and Drzal).

5. Alternatively, a moving veil with a layer of the polymer matrix film can be passed through the orientation chamber. The deposited fibers can then be laminated with another layer of the polymer film and heat treated to form a handleable mat or laminate with the desired fiber orientation. The thickness of such a material can be built by a series of orientation chambers and later compression molded to a composite part as in FIGS. 7 and 9. Matrix film impregnation and processing of ADF composites also offers a high speed processing option.

6. High speeds of fabrication are possible and amenable to CAD/CAM robotic manufacturing techniques. This can especially prove to be very effective in the case of a complex lay-up sequence often needed in a large part. Based on the Computer-Aided Design (CAD), one can program the field directions in the orientation chamber, the fiber and matrix powder feed rate to lay up powder impregnated fibers in the desired location with the desired fiber orientation with the orientation chamber being moved by a robotic arm.

7. Discontinuous fiber thermoplastic composites with controlled fiber orientation are a unique material form. A material form consisting of a polymeric matrix and inclusions such as fibers or elongated fillers (with aspect ratio greater than 1.0) where the orientation distribution of the inclusions can be controlled in a preferred fashion, thereby controlling the composite property. Anisotropy in the property can be controlled, unlike other processing methods like injection molding with fibers/fillers or compression molding of Sheet Molding Compounds (SMC) where the anisotropy in properties is manifested at undesired locations as a result of the processing operation and not a feature that can be controlled. Stiffness and strength of the ADF composites can be controlled by changing the fiber orientation distribution in the process to address the need for structural composites.

Other properties that can be similarly controlled are the electrical conductivity and the thermal properties by a suitable selection of the fibers and the matrix. Material form with a controlled electrical conductivity can find applications in electromagnetic shielding. Material forms with a preferred fiber orientation may also become very critical in bio-materials especially in the area of body implants. This composite also may have applications in the sports and recreation industries where lightweight composite materials are needed.

8. Short fibers (as small as 1/8") can be aligned and incorporated in the composite to give a material form that can be stamped into complex shapes. In the case of a material form with long fibers or continuous fiber composites it is not so easy to bend the fibers over small radii of curvature. Moreover this material form is superior than woven composites in terms of better compressive strengths and inter-laminar shear strengths.

9. Composites which consist primarily of thermoplastic matrices which can be recycled can be produced. Thermosetting polymers can be processed through this route if the polymer is available in the powder form and in an uncured state.

It is intended that the foregoing description be only illustrative of the present invention and that the present invention be limited only by the hereinafter appended claims.

We claim:

1. An apparatus for providing a sheet of aligned discontinuous fibers having a relatively long axis and a small cross-section which comprises:
   (a) a vertically oriented chamber defining a space with an open end;
   (b) a feeder plate inclined downward towards a horizontally oriented slot through which the fibers pass to alien the fibers along the horizontal plane into the space in the chamber;
   (c) spaced apart electrode plates in the space in the chamber and adjacent the open end of the chamber for providing an electrical field in the space in the chamber to align the fibers with the long axis between the plates;
   (d) support means below the open end of the space for depositing of the aligned fibers.

2. The apparatus of claim 1 wherein the feeder plate is provided with a vibrating means is provided on the feeder plate.

3. The apparatus of claim 1 wherein the support means is a conveyor means which moves past the open end of the chamber as the aligned discontinuous fibers are deposited on the support means.

4. The apparatus of claim 3 wherein a heater means is provided for heating the fibers deposited on the conveyor.

5. The apparatus of claim 1 wherein a dispensing means is provided for a sheet of material to be moved on the conveyor means as the support means onto which the aligned discontinuous fibers are deposited.

6. The apparatus of claim 5 wherein a second dispensing means is provided for a second sheet of material which covers the aligned fibers on the sheet on the conveyor after they are deposited.

7. The apparatus of claim 6 wherein a bonding means is provided to laminate the sheets together.

8. The apparatus of claim 1 wherein vertically oriented second electrode plates are provided below the surface and adjacent the electrode plates which second electrode plates neutralize the field adjacent the surface.

9. The apparatus of claim 1 wherein vertically oriented second electrode plates are provided below the surface and adjacent the electrode plates which second electrode plates act to neutralize the field adjacent the surface and wherein the second electrode plates are offset vertically from the vertically oriented plates.

10. The apparatus of claim 1 wherein vertically oriented second electrode plates are provided below the surface and adjacent the electrode plates which second electrode plates act to neutralize the field adjacent the surface, wherein the second electrode plates are offset vertically from the vertically oriented plates, and wherein the plates have an end adjacent the surface with a cylindrical cross-section.

11. An apparatus for producing a continuous sheet of a composite material of aligned discontinuous fibers which comprises:
   (a) a vertically oriented chamber defining a space with an open end;
   (b) a feeder plate inclined downward towards a horizontally oriented slot through which the fibers pass to align the fibers along the horizontal plane into the space in the chamber;
   (c) spaced apart electrode plates in the space in the chamber and adjacent the open end of the chamber for providing an electrical field in the space in the chamber to align the fibers with the long axis between the electrode plates;
   (d) a support means which is moved by a drive means past the open end of the chamber so as to continuously deposit the coated fibers on the support means; and
   (e) heater means away from the chamber through which the support is moved so as to melt the polymer powder and connect the fibers together to form the composite material.

* * * * *